United States Patent
Helfrich et al.

(10) Patent No.: US 6,237,427 B1
(45) Date of Patent: May 29, 2001

(54) FLOW RATE MEASURING SYSTEM FOR CROPS SUPPORTED ON A CONVEYOR

(76) Inventors: James C. Helfrich, 747 Millegan Rd., Great Falls, MT (US) 59405; Jeremy A. Helfrich, 502 N. 18$^{th}$, Bozeman, MT (US) 59715

(*) Notice: Subject to any disclaimer, the term of this patent is extended or adjusted under 35 U.S.C. 154(b) by 0 days.

(21) Appl. No.: 09/246,740

(22) Filed: Feb. 8, 1999

(51) Int. Cl.$^7$ ............................... G01F 15/00; G01F 1/28; G01B 3/00; B65G 43/00

(52) U.S. Cl. ................... 73/861.77; 73/861.74; 33/501.04; 198/502.2

(58) Field of Search ................. 73/861.74, 861.73, 73/861.71, 861.75, 861.76, 861.77, 861; 56/10.2 R; 33/501.02, 501.03, 501.04, 833, 834; 198/502.2, 635, 634

(56) References Cited

U.S. PATENT DOCUMENTS

| | | | |
|---|---|---|---|
| 825,863 | 7/1906 | Oliver | 73/861.75 |
| 1,773,816 | * 8/1930 | Lea | 73/861.73 |
| 2,312,216 | * 2/1943 | Keeler | 33/501.02 |
| 3,295,213 | * 1/1967 | Hillyar-Russ et al. | 73/861 |
| 3,638,659 | 2/1972 | Dalquist | 130/27 W |
| 3,640,136 | 2/1972 | Nolte | 73/228 |
| 3,774,446 | * 11/1973 | Diehl | 73/861 |
| 4,036,065 | 7/1977 | Strelioff et al. | 73/432 R |
| 4,122,715 | 10/1978 | Yokoyama | 73/228 |
| 4,157,661 | 6/1979 | Schindel | 73/228 |
| 4,354,622 | 10/1982 | Wood | 222/55 |
| 4,454,768 | 6/1984 | Nansel | 73/861.76 |
| 4,749,273 | 6/1988 | Reinhold | 356/5 |
| 5,033,313 | 7/1991 | Lew | 73/861.72 |
| 5,159,840 | 11/1992 | Leifeld | 73/861.73 |
| 5,230,251 | 7/1993 | Brandt, Jr. | 73/861.72 |
| 5,282,389 | 2/1994 | Fairre et al. | 73/861.73 |
| 5,343,761 | 9/1994 | Myers | 73/861.73 |
| 5,465,825 | * 11/1995 | Levaro et al. | 198/502.2 |
| 5,480,354 | 1/1996 | Sadjadi | 460/7 |
| 5,686,671 | 11/1997 | Nelson | 73/861.73 |
| 5,698,794 | 12/1997 | Bussian | 73/861.73 |
| 5,795,221 | 8/1998 | Dickhans | 460/6 |
| 5,824,916 | * 10/1998 | Posner, Jr. et al. | 73/861.77 |
| 6,003,387 | * 12/1999 | Larson et al. | 73/861.73 |
| 6,068,059 | * 5/2000 | Bajema et al. | 56/10.2 R |

* cited by examiner

Primary Examiner—Harshad Patel
Assistant Examiner—Jagdish Patel
(74) Attorney, Agent, or Firm—Jerry Johnson

(57) ABSTRACT

A flow rate measuring system for conveyed material includes a conveyor including a frame and a material supporting surface moveably supported by the frame. The flow rate measuring system utilizes height measurement devices which are responsive to the height of the material supported on the material supporting surface of the conveyor for taking material height measurements. A signal generating device provides an output signal in response to the height measurement device. The height of the material on a conveyor of known width and known speed allows the calculation of volume or mass flow rates. The height measurement device typically comprises a deflection impact surface which is a finger or paddle assembly. The flow rate measuring system for conveyed material additionally may include a signal processing device such as computer for taking and recording height measurements as specific intervals. The signal processing device may calculate an instantaneous flow rate of conveyed material relative to the height measurement of material supported on the material supporting surface of the conveyor.

16 Claims, 3 Drawing Sheets

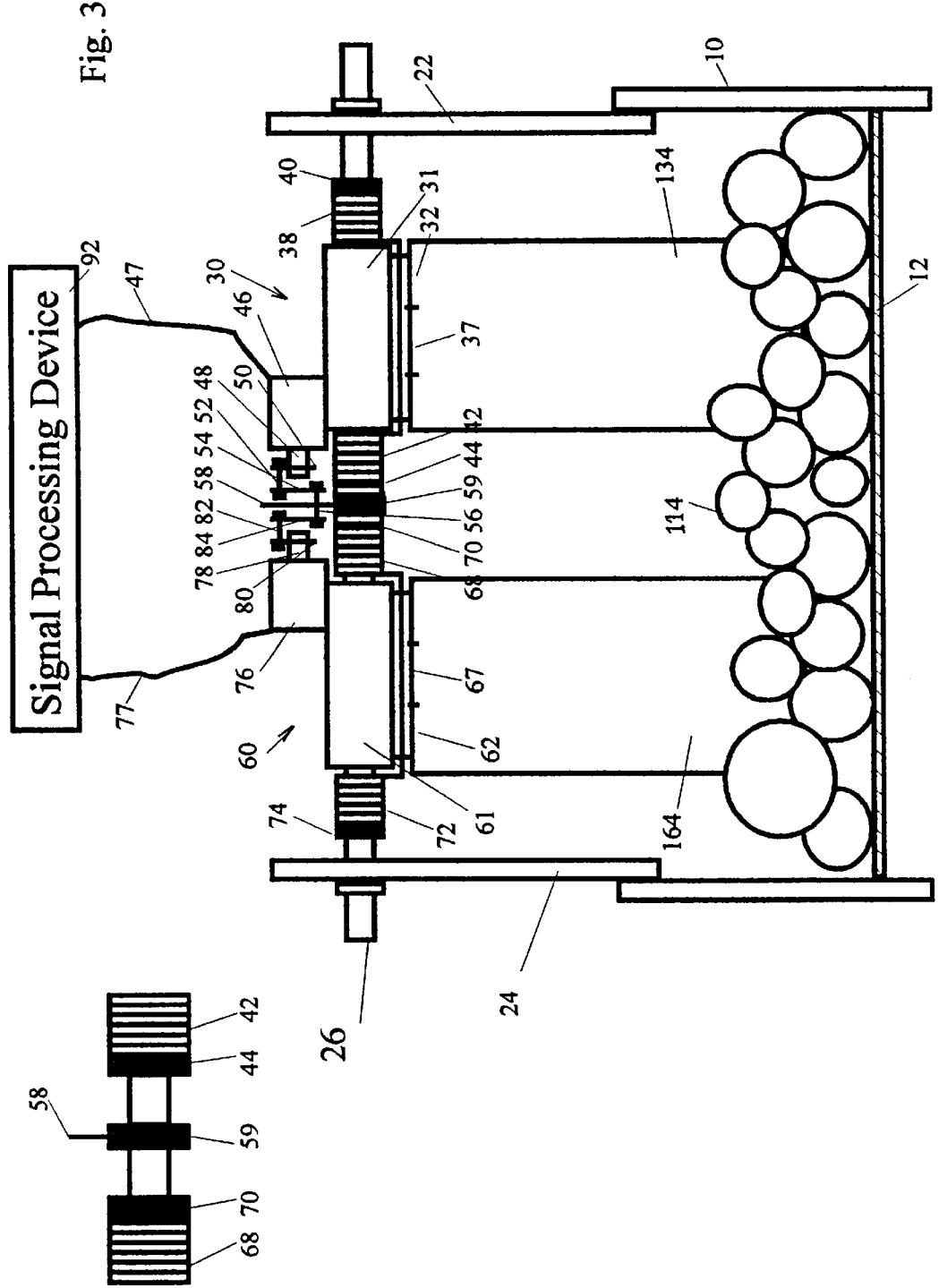

FLOW RATE MEASURING SYSTEM FOR CROPS SUPPORTED ON A CONVEYOR

BACKGROUND

Mass flow rate meters may be used to measure rate of mass flow of particulate materials within a system. Typically the particulate material is dropped onto an impact sensor or thrown against an impact sensor. The force exerted on the impact sensor is relative to the quantity of particulate material moving through the system. The movement or deflection of the impact sensor is converted by a transducer to a calculated mass flow rate.

These mass flow rate meters measure the force of airborne particulate materials which strike an impact sensor. Many materials are not suitable for dropping or throwing at a sensor. These materials would include harvested fruit and vegetable crops and other perishables.

Harvested fruit and vegetables are typically moved on a conveyor belt or chain. These conveyor systems may use scales to determine the mass flow rate of material moving along the conveyor.

Belt scales are a combination of an endless belt or chain of a conveyor with a weighing machine located under a portion of the endless belt The belt scale is disposed to sense the weight of a portion of the material on the belt that is immediately above the weighing machine. It is well known that there is no simple and direct correlation between true mass flow rate passing on the belt. The difference between maximum and minimum flow rate that can be accommodated with out re-calibration of the scale is very limited. A belt scale tends to be sensitive to changes in the humidity of the air as well as to the degree of moisture, or lack thereof, in the material being weighed. It should also be noted that the cost of a belt scale is high.

Belt scales are also undesirable for use on harvesting equipment. Belt scales are often too fragile to be mounted on the moving frame of harvesting equipment. A belt scale also would be inaccurate if the harvesting machine is operating on side slope. A belt scale also would measure soil which is included with the crops which would render the measurement inaccurate.

For the foregoing reasons there is a need for a flow rate measuring device for use with conveyor systems. There is a particular need for a mass flow rate measuring device which is suitable for use on fragile or perishable materials such as fruit or vegetables that are moving along conveyor equipment. There is also a need for a flow rate measuring device which has the necessary durability for use on conveyor systems of harvesting equipment. There is a need for a flow rate measuring device for use on conveyor systems of harvesting equipment which does not produce an inaccurate measurement if soil is included with the crops. There is also a need for a flow rate measuring device for use on conveyor systems of harvesting equipment which is not effected by the pitch or roll of the equipment when operated on a slope. There is also a need for a flow rate measuring device for use on "lifters" or lifting conveyors of harvesting equipment for sugar beets, potatoes, and other crops. These "lifters" or lifting conveyors lift the harvested crop out of the ground and convey the crop to the main conveyor system of the harvester.

SUMMARY

A flow rate measuring system for conveyed material includes a conveyor including a frame and a material supporting surface moveably supported by the frame. The material supporting surface moves relative to the frame, and material supported on the material supporting surface is substantially stationary relative to the material supporting surface. The flow rate measuring system utilizes height measurement devices which are responsive to the height of the material supported on the material supporting surface of the conveyor for taking material height measurements. A signal generating device provides an output signal in response to the height measurement device. The height of the material on a conveyor of known width and known speed allows the calculation of volume or mass flow rates.

The height measurement device typically comprises a deflection impact surface which is disposed on a finger or paddle assembly. The deflection impact surface depends from a pivot location vertically disposed above the material support surface. The deflection impact surface may also be spring biased about the pivot location. The signal generating means may comprise a transducer for converting a height measurement to an electrical signal. The flow rate measuring system for conveyed material additionally may include a signal processing device such as a computer for taking and recording height measurements as specific intervals. The signal processing device may calculate an instantaneous flow rate of conveyed material relative to the height measurement of material supported on the material supporting surface of the conveyor. The flow rate measuring system for conveyed material may including two or more height measurement devices spaced laterally in relation to the width of the conveyor belt.

There are significant benefits provided by the flow rate measuring system of the present invention.

A first benefit provided by the flow rate measuring system of the present invention is the ability to measure flow rates on a conveyor system. Many materials are moved by conveyor systems. The ability to measure the flow rate of materials moved within a system allows for efficient operation of the material moving process. The flow rate measuring system of the present invention allows for the accurate measurement of material height at one or more locations on the conveyor to be used in flow rate calculations. By using a height measurement, the present invention allows a much simpler flow rate measuring system than existing bulk weight systems. The flow rate measuring system further allows for the accurate flow rate of perishable materials such as fruits and vegetables to be measured while the materials are moving on a conveyor. This allows for the measuring of the materials by a process other than weighing, which is not always possible.

The deflection assembly used in the present invention is disposed above the moving conveyor and is impacted by material traveling on the conveyor. The flow rate measuring system includes means through which the deflection assembly can be adjusted so that perishable materials will not be damaged by the deflection assembly. In this way, the flow rate measuring system may be used on different crops such as fruits and vegetables and will accommodate the particular fragility of each individual crop.

The flow rate measuring system has particular benefits to crop harvesting equipment. Fruit and vegetable harvesting equipment typically use conveyor systems to move harvested crops from the location in the field where the crop is grown to transport machinery which is used to move the harvested crops. Bulk weighing systems used on conveyors are typically too fragile for use on moving machinery. The flow rate measuring system of the present invention has the durability necessary to work while mounted on moving equipment. The flow rate measuring system may be used with conveyors of all type including common belt and chain systems. The flow rate measuring system of the present invention is usable on the conveyor systems of harvesting equipment including the conveyors used in lifters.

The flow rate measuring system is not affected by soil within the flow of crops moved by the conveyor system. Bulk weighing systems would typically measure the entire quantity of all material on the conveyor belt. A correction for the amount of soil included with the crops would be necessary to improve the accuracy of the measurement. In the present system, soil within the flow of crops would not affect the measured height of the crops in relation to the conveyor material supporting surface. If soil clumps are present within the flow of crops, the deflection assembly used for height measurement in the flow rate measuring system could be adjusted so that the fingers of the deflection assembly would not deflect from the impact with soil clumps.

The flow rate measuring system can also incorporate a reverse flow arrangement to accommodate the reversing of the conveyor for unplugging purposes with out affecting the measuring device.

The flow rate measuring system for conveyed material may produce many types of useful measurements. In a simple version of the invention, the height measurement device of the invention would produce a visible signal if the height of material on the conveyor is too high and might result in damage to the material being moved. The flow rate measuring system for conveyed material of the present invention is usable in complex mapping systems that plot the volume or mass of crops harvested throughout a field.

DRAWINGS

FIG. 3 is a front view of a second version of the flow rate measuring system of the present invention.

DESCRIPTION

Figure 1:
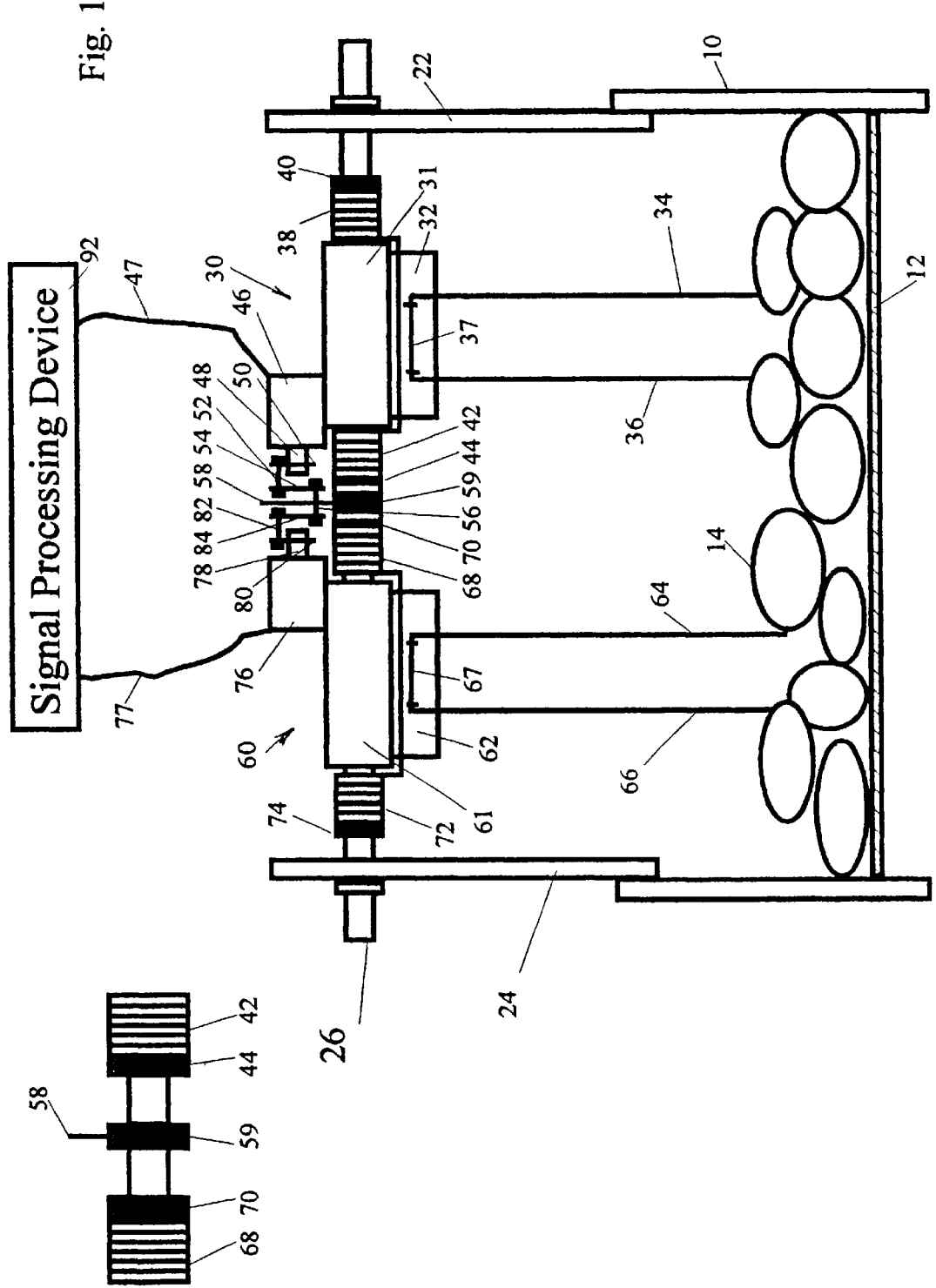
FIG. 1 is a front view of a first version of the flow rate measuring system of the present invention.

FIG. 1 shows a side view of the mechanical elements of a first version of the flow rate measuring system of the present invention.

The flow rate measuring system is shown mounted on a conveyor frame 10. The conveyor frame 10 could be part of a harvester, food processing equipment, material handling equipment, factory equipment, etc. The conveyor frame 10 supports a moving, material supporting, conveyor surface 12 which may be belt, conveyor chain, or a series of rotating conveyor rollers. The conveyor surface 12 moves relative to the frame 10. The frame 10 may be a stationary piece of material handling equipment, or may be a moving piece of material handling equipment such as a harvester. Disposed on the conveyor material supporting surface 12 is a layer of material 14 which represents harvested vegetable crops such as potatoes or sugar beets. The material measured could also be fruit, rock, or other bulk material. The material 14 is typically stationary relative to the conveyor material supporting surface, as the material moves at a velocity equal to that of the conveyor.

The flow rate measuring system includes mounting bracket support arms 22 and 24 which are attached to the conveyor frame 10. Mounting bracket support arms 22 and 24 each support an opposite end of a mounting shaft 26. Supported on the shaft 26 are two material height measuring devices 30 and 60. Included in each material height measuring device are pivoting sensor housings 31 and 61. Pivoting sensor housings 31 and 61 typically include bearings on which the sensor housings pivot in relation to the mounting shaft 26. Attached to the pivoting sensor housings 31 and 61 are mounting plates 32 and 62. Mounting plates 32 and 62 provide a flat attachment surface for fingers 34 and 36 which are attached to mounting plate 32, as well as for fingers 64 and 66 attached to mounting plate 62. The shaft 26 serves as the pivot about which the sensor housing pivot, and accordingly, also the pivot about which the mounting plates and the fingers pivot. Fingers 34 and 36 are part of a U-shaped assembly including connecting element 37. Similarly, fingers 64 and 66 along with connecting element 67 form a second U-shaped assembly. Each finger is a deflecting impact surface for material which is moving beneath the height measurement device on the conveyor. Accordingly, material 14 supported on the moving conveyor material supporting surface will deflect the fingers rearwardly as the material impacts and passes under the fingers. The fingers will deflect rearwardly an amount relative to the height of the top of the material on the conveyor. The fingers maintain contact with the top of the layer of material which is passing underneath.

Fingers 34 and 36 are biased forwardly by coil springs 38 and 42. Coil springs 38 and 42 are secured to the mounting shaft by adjustable locking collars 40 and 44, respectively. Fingers 64 and 66 are biased forwardly by coil springs 68 and 72. Coil springs 68 and 72 are secured to the mounting shaft by adjustable locking collars 70 and 74, respectively. Adjustable locking collars allow the spring tension to be adjusted so that the downward force applied to the material layer 14 can be properly adjusted. Spring adjustment provide the necessary range of spring tensions to accommodate different materials as diverse as soft fruit or hard rock. Of course, springs with different spring rates may also be used for this adjustment. Also possible is the use of springs other than metal coil springs. The fingers are may be positioned at a perpendicular position relative to the conveyor material supporting surface or at a starting position where the fingers are rotated rearwardly in relation to the shaft 26. The fingers freely rotate forwardly in relation to the shaft. This allows the conveyor operator to reverse the direction of the conveyor should a plugging situation occur.

The rearward rotation of the fingers results in the forward rotation of potentiometers 46 and 76. Potentiometer shafts 48 and 78 are shown extending from potentiometers 46 and 76. The shafts 48 and 78 do not rotate with the potentiometer housings as the axis of the potentiometer shafts are held in a stationary rotational position relative to the axis of the mounting shafts while the potentiometers rotate around the mounting shaft 26 due to the deflection of fingers 34, 36, 64 and 66.

Figure 2:
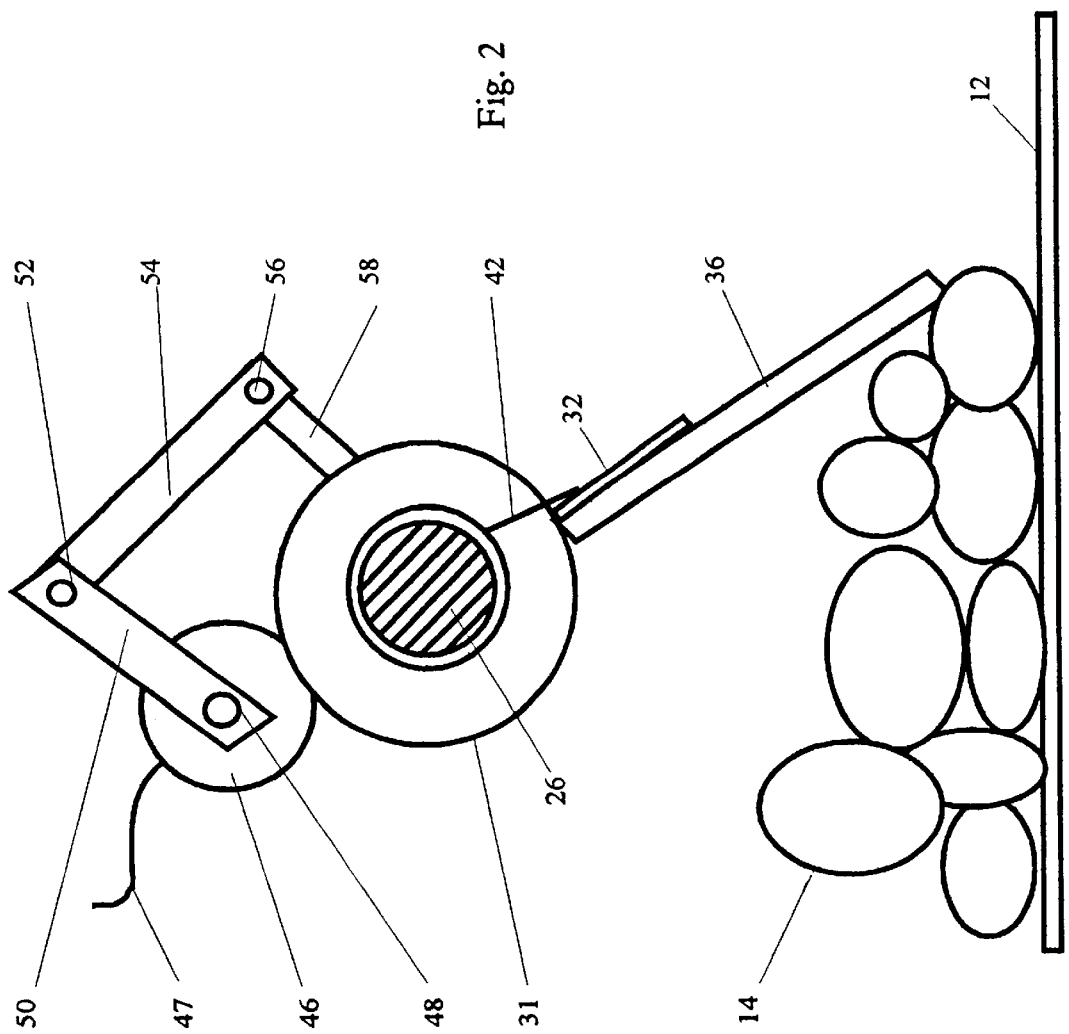
FIG. 2 is a side view of the first version of the flow rate measuring system of the present invention.

The linkage which maintains the stationary rotational position of the potentiometer shaft 48 is best shown in a side view in FIG. 2. The linkage includes a first link arm 50, a second link arm 54, and a third link arm 58. Pivot pin 52 attaches link arms 50 and 54. Pivot pin 56 attaches link arm 54 to link arm 58. Link arm 58 is secured to an adjustable locking collar 59 (shown in FIGS. 1 and 3) which allows for the calibration of the potentiometer.

Extending from potentiometer 76 is potentiometer shaft 78. The potentiometer shaft 78 is also attached through link arms 80, 84 and pivot pins 82, 56 to link arm 58. Potentiometer shaft 78 is also non-rotationally attached to the mounting shaft 26 at adjustable collar 59, through the link arm 58.

Potentiometers 46 and 76 comprise signal generating transducers through which the deflection of the fingers is converted to an electrical output signal which is a variation of electrical resistance. By measuring the deflection of the fingers, the height of the material may be calculated. The output signal generated by the potentiometer is calibrated to produce an accurate height measurement which corresponds to the given deflection. Potentiometers 46 and 76 include connection cables 47 and 77 for attachment to a signal processing device 92 which may be a computer which takes height measurements at specific distance or time intervals.

FIG. 2 shows a side view of the mechanical elements of the flow rate measuring system of the present invention. The mounting shaft 26 is shown in cross section. Finger 36 is shown deflecting rearwardly as it is impacted by material 14 passing underneath. The potentiometer 46 is shown rotating forwardly in relation to the shaft 26. The coil spring 42 biases the fingers forwardly to force the finger 36 onto the top of material 14 passing underneath the device to ensure an accurate deflection measurement of the finger 36.

The use of two or more height measurement devices spaced laterally across the conveyor 12 allows for an accurate measurement if the conveyor is tilted due to the operation of equipment on a side slope. It is understood that the flow rate measuring system of the present invention may use one or many more height measurement devices spaced laterally across the conveyor. The use of more devices will ensure a more accurate flow rate measurement.

FIG. 3 shows a front view of the mechanical elements of a second version of the flow rate measuring system of the present invention. The fingers 34, 36, 64, and 66 have been replaced with paddles 134 and 164. All other mechanical elements of the flow rate measuring system are the same as those described in FIG. 1. The paddles 134 and 164 provide a larger impact surface which would also apply the downward pressure of the paddle, provided by spring tension, over a larger surface of fruit crop material 114. The thickness of the paddles may also be increased for the purpose of distributing the force over a larger surface. Accordingly, the paddles 134 and 164 may be appropriate for use with delicate, perishable crops such as grapes.

The flow rate measuring system of the present invention provides a device through which the deflection of an impacted surface by a material passing underneath may be calibrated into a height measurement. The height measurements may be taken at specific distance or time intervals. These height measurements allow for the easy calculation of instantaneous volume or mass flow rates for material moving on a conveyor of a known width moving at a particular speed. When the system is mounted on harvesting equipment, the instantaneous flow rates at specific distance intervals taken within a field may be determined. The exact position of the harvester within the field may be determined by a Global Positioning System (GPS) integrated into the signal processing device 92. The signal processing device 92 may calculate the instantaneous flow rates at specific distance intervals as determined by the GPS to create a map of the field for use in yield analysis.

Although potentiometers have been disclosed for use as transducers for converting the deflection of the fingers or paddles to an electrical output signal, it is understood that other devices such as strain gauges could have been used for this purpose. It is also understood that devices for measuring the height of material on a conveyor other than the deflecting impact surfaces of fingers or paddles may have been used.

It is understood that various modifications and changes in form or detail could readily be made without departing from the spirit of the invention. It is therefore intended that the invention be not limited to the exact form and detail herein shown and described, nor to anything less than the whole of the invention herein disclosed and as hereinafter claimed.

We claim:

1. A flow rate measuring system for crop material moving on a conveyor of a moving crop harvester, the system comprising:

a frame supporting the conveyor, the conveyor having a crop material supporting surface;

wherein the crop material supporting surface moves with respect to the frame at a known speed and direction to support the crop material; the crop material having a height;

at least one height measurement device supported by the frame above the crop material supporting surface responsive to the height of crop material supported on the crop material supporting surface beneath the height measurement device; and wherein the height measurement device includes at least one deflection impact surface; and wherein the deflection impact surface deflects in the same direction as the movement of the crop material supporting surface; a signal generating transducer connected to the deflection impact surface to convert a deflection of the deflection impact surface to an electrical signal; and, wherein the electrical signal of the signal generating transducer corresponds to a height measurement of the crop material;

a signal processor calculate an instantaneous flow rate of crop material on the crop material supporting surface relative to the height measurement of crop material supported on the crop material supporting surface; and, wherein the signal processor includes an electrical connection connecting the signal processor with the signal generating transducer;

wherein the signal processor includes a global positioning device to calculate distance intervals; wherein the signal processor takes and records height measurements at specific distance intervals of the frame; and, wherein the global positioning device further assigns a global position to the instantaneous flow rate of crop material on the crop material supporting surface; and wherein the instantaneous flow rate of crop material on the crop material supporting surface as calculated by the signal processor is for use creating a crop yield analysis map of a field from which the crop material is harvested.

2. The flow rate measuring system of claim 1, wherein the deflection impact surface is a finger.

3. The flow rate measuring system of claim 2, wherein the at least one height measurement device includes two fingers.

4. The flow rate measuring system of claim 1, wherein the deflection impact surface is a paddle.

5. The flow rate measuring system of claim 1, wherein the height measurement device includes a shaft supported by the frame which does not move relative to the frame, and wherein the deflection impact surface pivots about the shaft; and, wherein the shaft further includes a spring connecting the deflection pact surface to the shaft; and, wherein the deflection impact surface is spring biased about the shaft.

6. The flow rate measuring system of claim 1, wherein the crop material supporting surface has a longitudinal direction of movement; and wherein the crop material supporting surface has a lateral perpendicular width relative to the longitudinal direction of movement of the crop material supporting surface; and wherein the at least one height measurement device includes two height measurement devices; and, wherein the two height measurement devices are spaced laterally in relation to the crop material supporting surface longitudinal direction of movement across the lateral perpendicular width of the crop material supporting surface.

7. A flow rate measuring system for crop material moving on a conveyor of a moving crop harvester, the system comprising:
   a frame supporting the conveyor, the conveyor having a crop material supporting surface;
   wherein the crop material supporting surface moves with respect to the frame at a known speed and direction to support the crop material; the crop material having a height;
   a first height measurement device supported by the frame above the crop material supporting surface responsive to the height of crop material supported on the crop material supporting surface beneath the first height measurement device; and wherein the first height measurement device includes at least one deflection impact surface; and wherein the deflection impact surface deflects in the same direction as the movement of the crop material supporting surface; a first signal generating transducer connected to the deflection impact surface to convert a deflection of the deflection impact surface to an electrical signal; and, wherein the electrical signal of the first signal generating transducer corresponds to a first height measurement of the crop material;
   a second height measurement device supported by the frame above the crop material supporting surface responsive to the height of the crop material supported on the crop material supporting surface beneath the second height measurement device; and wherein the second height measurement device includes at least one deflection impact surface; and wherein the deflection impact surface deflects in the same direction as the movement of the crop material supporting surface; a second signal generating transducer connected to the deflection impact surface to convert the deflection of the deflection impact surface to an electrical signal; and, wherein the electrical signal of the second signal generating transducer corresponds to a second height measurement of the crop material;
   wherein the crop material supporting surface has a longitudinal direction of movement; and wherein the crop material supporting surface has a lateral perpendicular width relative to the longitudinal direction of movement of the conveyor crop material supporting surface; and, wherein the two height measurement devices are spaced laterally in relation to the conveyor crop material supporting surface longitudinal direction of movement across the lateral perpendicular width of the crop material supporting surface;
   signal processor to calculate an instantaneous flow rate of crop material on the crop material supporting surface relative to the first and second height measurements of crop material supported on the crop material supporting surface; and, wherein the signal processor includes an electrical connection connecting the signal processor with the first and second signal generating transducers;
   wherein the signal processor takes and records first and second height measurements at specific intervals; and wherein the instantaneous flow rate of crop material on the conveyor calculated by the signal processor is for use in crop yield analysis of a field from which the crop material is harvested.

8. The flow rate measuring system of claim 7, wherein the at least one deflection impact surface of each height measurement device is a finger.

9. The flow rate measuring system of claim 8, wherein each height measurement device includes two fingers.

10. The flow rate measuring system of claim 8, wherein the at least one deflection impact surface of each height measurement device is a paddle.

11. The flow rate measuring system of claim 7, wherein the height measurement device includes a shaft supported by the frame which does not move relative to the frame, and wherein the deflection impact surface pivots about the shaft; and, wherein the shaft further includes a spring connecting the deflection impact surface to the shaft; and, wherein the deflection impact surface is spring biased about the shaft.

12. The flow rate measuring system of claim 7, wherein the signal processing device includes a global positioning device for calculating distance intervals; wherein the signal processor takes and records height measurements at specific distance intervals of the frame; and, wherein the global positioning device further assigns a global position to the instantaneous flow rate of crop material on the crop material supporting surface; and wherein the instantaneous flow rate of crop material on the crop material supporting surface, as calculated by the signal processor, is for use creating a crop yield analysis map of a field from which the crop material is harvested.

13. A flow rate measuring system for crop material moving on a conveyor of moving crop harvester, the system comprising:
   a frame supporting the conveyor, the conveyor having a crop material supporting surface;
   wherein the crop material supporting surface moves with respect to the frame at a known speed and direction to support the crop material; the crop material having a height;
   at least one height measurement device supported by the frame above the crop material supporting surface responsive to the height of the crop material supported on the crop material supporting surface beneath the height measurement device; and wherein the height measurement device includes at least one deflection impact surface, and, wherein the deflection impact surface deflects in the same direction as the movement of the crop material supporting surface; wherein the height measurement device includes a shaft supported by the frame above the frame that does not move relative to the frame, and wherein the deflection impact surface pivots about the shaft; and, wherein the shaft further includes a spring connecting the deflection impact surface to the shaft; and, wherein the deflection impact surface is spring biased about the shaft;
   wherein the at least one deflection impact surface is a finger;
   a signal generating transducer connected to the deflection impact surface to convert a deflection of the deflection impact surface to an electrical signal; and, wherein the electrical signal of the signal generating transducer corresponds to a height measurement of the crop material;
   a signal processor to calculate an instantaneous flow rate of crop material on the crop material supporting surface relative to the height measurement of crop material supported on the crop material supporting surface; and, wherein the signal processor includes an electrical connection connecting the signal processor with the signal generating transducer;

and, wherein the signal processor takes and records a height measurement at specific intervals; and, wherein the instantaneous flow rate of crop material on the conveyor calculated by the signal processor is for use in crop yield analysis of a field from which the crop material is harvested.

14. The flow rate measuring system of claim 13, wherein the height measurement device includes two fingers.

15. The flow rate measuring system of claim 13, wherein the crop material supporting surface has a longitudinal direction of movement; and wherein the crop material supporting surface has a lateral perpendicular width relative to the longitudinal direction of movement of the crop material supporting surface; and wherein the at least one height measurement device includes two height measurement devices; and, wherein the two height measurement devices are spaced laterally in relation to the crop material supporting surface longitudinal direction of movement across the lateral perpendicular width of the crop material supporting surface.

16. The flow rate measuring system of claim 13, wherein the signal processor includes a global positioning device to calculate distance intervals; wherein the signal processor takes and records height measurements at specific distance intervals of the frame; and, wherein the global positioning device further assigns a global position to the instantaneous flow rate of crop material on the crop material supporting surface; and wherein the instantaneous flow rate of crop material on the crop material supporting surface as calculated by the signal processor is for use creating a crop yield analysis map of a field form which the crop material is harvested.

* * * * *